United States Patent
Wang et al.

(10) Patent No.: US 11,410,379 B2
(45) Date of Patent: Aug. 9, 2022

(54) POINT CLOUD MODEL RECONSTRUCTION METHOD, APPARATUS, AND SYSTEM

(71) Applicant: Siemens Ltd., China, Beijing (CN)

(72) Inventors: Hai Feng Wang, Shanghai (CN); Wen Chao Zou, Shanghai (CN); Shao Tu Jia, Fuxin (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 16/970,691

(22) PCT Filed: Aug. 1, 2019

(86) PCT No.: PCT/CN2019/098910
§ 371 (c)(1),
(2) Date: Aug. 24, 2020

(87) PCT Pub. No.: WO2021/016996
PCT Pub. Date: Feb. 4, 2021

(65) Prior Publication Data
US 2022/0148258 A1 May 12, 2022

(51) Int. Cl.
*G06T 17/00* (2006.01)
(52) U.S. Cl.
CPC .......... *G06T 17/00* (2013.01); *G06T 2210/56* (2013.01)
(58) Field of Classification Search
None
See application file for complete search history.

(56) References Cited

U.S. PATENT DOCUMENTS

| 2011/0115783 A1 | 5/2011 | Janson |
| 2013/0057548 A1 | 3/2013 | Schreckenberg |

(Continued)

FOREIGN PATENT DOCUMENTS

| CN | 103646421 A | 3/2014 |
| CN | 104361625 | 2/2015 |

(Continued)

OTHER PUBLICATIONS

European Communication dated Sep. 11, 2020.
(Continued)

*Primary Examiner* — Peter Hoang
(74) *Attorney, Agent, or Firm* — Harness, Dickey & Pierce, P.L.C.

(57) ABSTRACT

A point cloud model reconstruction method, apparatus, and system are disclosed. In an embodiment, the method includes randomly selecting four non-coplanar reconstruction points in a point cloud model; iteratively selecting other reconstruction points successively until a reconstruction condition is met, and reconstructing the point cloud model based on all reconstruction points. A reduction degree of a reconstructed point cloud model is: Reward=−k·(Point-Num−4)+g·VolRate, where PointNum represents a number of current selected reconstruction points, VolRate represents a ratio of a volume of a solid shape, k represents a proportion of the number of the selected points, and g represents a proportion of the volume ratio. The reconstruction method further includes adjusting a ratio of g to k based on user requirements to adjust the reconstruction condition. The mechanism provided in an embodiment can improve resolution of a reconstructed point cloud model and control quality of points in the reconstructed point cloud model.

11 Claims, 5 Drawing Sheets

(56) References Cited

U.S. PATENT DOCUMENTS

| | | |
|---|---|---|
| 2016/0364917 A1 | 12/2016 | Zhang et al. |
| 2017/0193692 A1 | 7/2017 | Huang et al. |
| 2018/0165004 A1 | 6/2018 | Hurley et al. |
| 2020/0142384 A1 | 5/2020 | Bressler |

FOREIGN PATENT DOCUMENTS

| | | |
|---|---|---|
| CN | 107223268 A | 9/2017 |
| CN | 108759665 A | 11/2018 |
| CN | 109472861 A | 3/2019 |
| GB | 201710876 | 7/2017 |
| WO | WO-2019012539 A1 | 1/2019 |

OTHER PUBLICATIONS

Extended European Search Report dated Oct. 19, 2021.
European Communication dated Nov. 8, 2021.
International Search Report and Written Opinion and English translation thereof dated May 9, 2020.

POINT CLOUD MODEL RECONSTRUCTION METHOD, APPARATUS, AND SYSTEM

BACKGROUND

Priority Statement

This application is the national phase under 35 U.S.C. § 371 of PCT International Application No. PCT/CN2019/098910 which has an International filing date of Aug. 1, 2019, which designated the United States of America, the entire contents of which are hereby incorporated by reference herein, in their entirety and for all purposes.

FIELD

Embodiments of the present invention generally relate to the field of point cloud models, and in particular, to a point cloud model reconstruction method, apparatus, and system.

BACKGROUND

Current problems to be resolved in point cloud model reconstruction include controlling resolution in the point cloud model reconstruction, including defining resolution of the point cloud model based on specific applications. For example, in an ultrasonic mode haptic interface, a center point needs to be maintained at specific density to guarantee a good sense of touch for people. In addition, control of a number of points in the point cloud reconstruction also needs to be considered. Some edge computing devices have limited computing efficiency. Users need to control a number of points in a point cloud model to guarantee proper operation of the device. Efficiently extracting a main feature with acceptable accuracy in the point cloud reconstruction also needs to be considered. However, it is difficult to efficiently extract a main feature from a point cloud model with points of a number less than a possible number by using existing algorithms.

The prior art has some point cloud filters, such as straight-pass filter, a Voxel filter, a statistical filter, and a conditional filter. The filters can reduce a point number and maintain accuracy. However, users cannot clearly define resolution, a number, and accuracy of point cloud structures by using the point cloud filters.

SUMMARY

A first embodiment of the present invention provides a point cloud model reconstruction method, including the following steps: randomly selecting four non-coplanar reconstruction points in a point cloud model; keeping iteratively selecting other reconstruction points successively until a reconstruction condition is met, and reconstructing the point cloud model based on all reconstruction points, where a reduction degree of a reconstructed point cloud model is:

$$\text{Reward} = -k \cdot (\text{PointNum} - 4) + g \cdot \text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree. The reconstruction method further includes the following step: adjusting a ratio of g to k based on user requirements to adjust the reconstruction condition.

Further, when the reconstruction condition is that a combination of a defined total number of reconstruction point has the highest reduction degree, the reconstruction method further includes: defining a total number of reconstruction points; and keeping selecting other reconstruction points successively, calculating reduction degrees of different combinations of the total number of reconstruction points, respectively, and selecting the reconstruction point combination with the highest reduction degree.

Further, when the reconstruction condition is that the ratio of the volume of the solid shape formed by all of the current reconstruction points and the original volume of the point cloud model reaches a first threshold, the reconstruction method further includes: defining the first threshold; and keeping selecting other reconstruction points successively, and calculating ratios of volumes of solid shapes formed by all of the current reconstruction points to the original volume of the point cloud model, respectively, until the first threshold is reached.

Further, when the reconstruction condition is that a reconstruction point combination in which a selection range of other reconstruction points is defined based on the four reconstruction points has the highest reduction degree, the reconstruction method further includes: defining the selection range of the other reconstruction points in the point cloud model by using the four reconstruction points; and keeping selecting other reconstruction points in the selection range successively, calculating reduction degrees of different reconstruction point combinations, respectively, and selecting the reconstruction point combination with the highest reduction degree.

Further, the reconstruction method is performed based on the following rules: in a reconstruction method performed under each reconstruction condition, each reconstruction point is allowed to be selected only once; a larger path depth of a selected reconstruction point indicates fewer reconstruction points as child nodes in each reconstruction point layer in the path; if a first reconstruction point is collinear with two reconstruction points prior to the first reconstruction point, the first reconstruction point and a path branch thereafter are invalid; if a second reconstruction point is coplanar with three reconstruction points prior to the second reconstruction point, the second reconstruction point and a path branch thereafter are invalid; and if a reduction degree based on all reconstruction point combinations is lower than a previous reduction degree when a third reconstruction point is selected, the third reconstruction point and a path branch thereafter are invalid.

A second embodiment of the present invention provides a point cloud model reconstruction apparatus, including: a selection apparatus configured to randomly select four non-coplanar reconstruction points in the point cloud model; a reconstruction apparatus configured to keep iteratively selecting other reconstruction points successively until a reconstruction condition is met, reconstruct the point cloud model based on all reconstruction points, and adjust a ratio of g to k based on user requirements to adjust the reconstruction condition, where a reduction degree of a reconstructed point cloud model is:

$$\text{Reward} = -k \cdot (\text{PointNum} - 4) + g \cdot \text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree.

Further, when the reconstruction condition is that a combination of a defined total number of reconstruction points has the highest reduction degree, the reconstruction apparatus is further configured to: define a total number of reconstruction points; and keep selecting other reconstruction points successively, calculate reduction degrees of different combinations of the total number of reconstruction points, respectively, and select the reconstruction point combination with the highest reduction degree.

Further, when the reconstruction condition is that the ratio of the volume of the solid shape formed by all of the current reconstruction points and the original volume of the point cloud model reaches a first threshold, the reconstruction apparatus is further configured to: define the first threshold; and keep selecting other reconstruction points successively, and calculate ratios of volumes of solid shapes formed by all of the current reconstruction points to the original volume of the point cloud model, respectively, until the first threshold is reached.

Further, when the reconstruction condition is that a reconstruction point combination in which a selection range of other reconstruction points is defined based on the four reconstruction points has the highest reduction degree, the reconstruction apparatus is further configured to: define the selection range of the other reconstruction points in the point cloud model by using the four reconstruction points; and keep selecting other reconstruction points in the selection range successively, calculate reduction degrees of different reconstruction point combinations, respectively, and select the reconstruction point combination with the highest reduction degree.

Further, the reconstruction apparatus performs operations based on the following rules: in a reconstruction method performed under each reconstruction condition, each reconstruction point is allowed to be selected only once; a larger path depth of a selected reconstruction point indicates fewer reconstruction points as child nodes in each reconstruction point layer in the path; if a first reconstruction point is collinear with two reconstruction points prior to the first reconstruction point, the first reconstruction point and a path branch thereafter are invalid; if a second reconstruction point is coplanar with three reconstruction points prior to the second reconstruction point, the second reconstruction point and a path branch thereafter are invalid; and if a reduction degree based on all reconstruction point combinations is lower than a previous reduction degree when a third reconstruction point is selected, the third reconstruction point and a path branch thereafter are invalid.

A third embodiment of the present invention provides a point cloud model reconstruction system, including: a processor; and a memory coupled to the processor, where the memory stores instructions that, when executed by the processor, cause an electronic device to perform actions including: randomly selecting four non-coplanar reconstruction points in a point cloud model; keeping iteratively selecting other reconstruction points successively until a reconstruction condition is met, and reconstructing the point cloud model based on all reconstruction points, where a reduction degree of a reconstructed point cloud model is:

$$\text{Reward} = -k \cdot (\text{PointNum} - 4) + g \cdot \text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree; and adjusting a ratio of g to k based on user requirements to adjust the reconstruction condition A fourth embodiment of the present invention provides a computer program product tangibly stored on a computer readable medium and including computer executable instruction that, when executed, cause at least one processor to perform the method according to the first embodiment of the present invention.

A fifth embodiment of the present invention provides a computer readable medium storing computer executable instructions that, when executed, cause at least one processor to perform the method according to the first embodiment of the present invention.

The point cloud model reconstruction mechanism provided in the present invention can improve resolution of a reconstructed point cloud model, control quality of points in the reconstructed point cloud model, and extract a feature point from a 3D point cloud model. In the present invention, point cloud model reconstruction can be further performed based on a user selection and inputted information. In addition, in the present invention, a display capability and utilization of computing resources can be improved, and a display capability of the point cloud model on an edge device can be optimized. In addition, in the present invention, a point cloud model can be presented based on a small number of points, and a data set can be generated for machine learning, for example, in 3D object recognition and localization.

DETAILED DESCRIPTION OF THE EXAMPLE EMBODIMENTS

The following describes specific implementations of the present invention with reference to the accompanying drawings.

Figure 1:
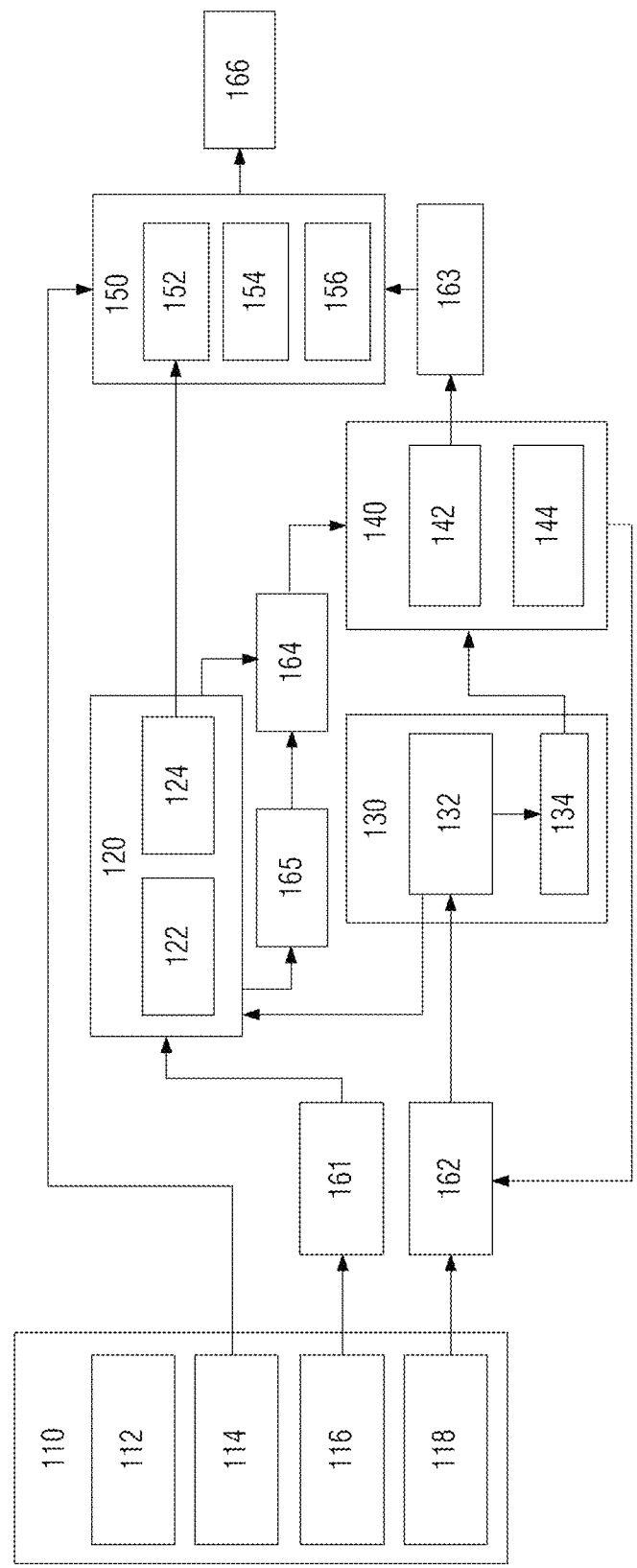
FIG. 1 is a schematic structural diagram of a point cloud model reconstruction apparatus according to a specific embodiment of the present invention.

FIG. 1 is a schematic structural diagram of a point cloud model reconstruction apparatus according to a specific embodiment of the present invention. As shown in FIG. 1, the point cloud structure reconstruction apparatus includes a user interaction apparatus 100, a reduction degree calculation apparatus 120, a point processing apparatus 130, a path switching apparatus 140, and a mode switching apparatus 150. A user inputs relevant information in the user interaction apparatus 100 and imports a 3D model to obtain a point cloud model to be processed. A selected reconstruction point is sent to the point processing apparatus 130 to determine whether the selected reconstruction point conforms to a rule, and then the reduction degree calculation apparatus 120 calculates a reduction degree of the reconstruction point that conforms to the rule. Growth and cutting of a path branch of the iterative reconstruction point is controlled in the path switching apparatus 140. Finally, a determining apparatus serving as a trigger condition of a final output apparatus 166 in the mode switching apparatus 150 outputs a final selected reconstruction point and a growth path and a reduction degree thereof.

A first embodiment of the present invention provides a point cloud model reconstruction method, including the following steps.

Step S1 of randomly selecting four non-coplanar reconstruction points in a point cloud model is first performed. Specifically, the user interaction apparatus includes a model importing apparatus 112, a mode setting apparatus 114, a parameter input apparatus 116, and a point initialization apparatus 118. The model importing apparatus 112 is configured to import a 3D model to obtain a point cloud model to be processed, and a user selects four non-coplanar reconstruction points through the point initialization apparatus 118.

Figure 2:
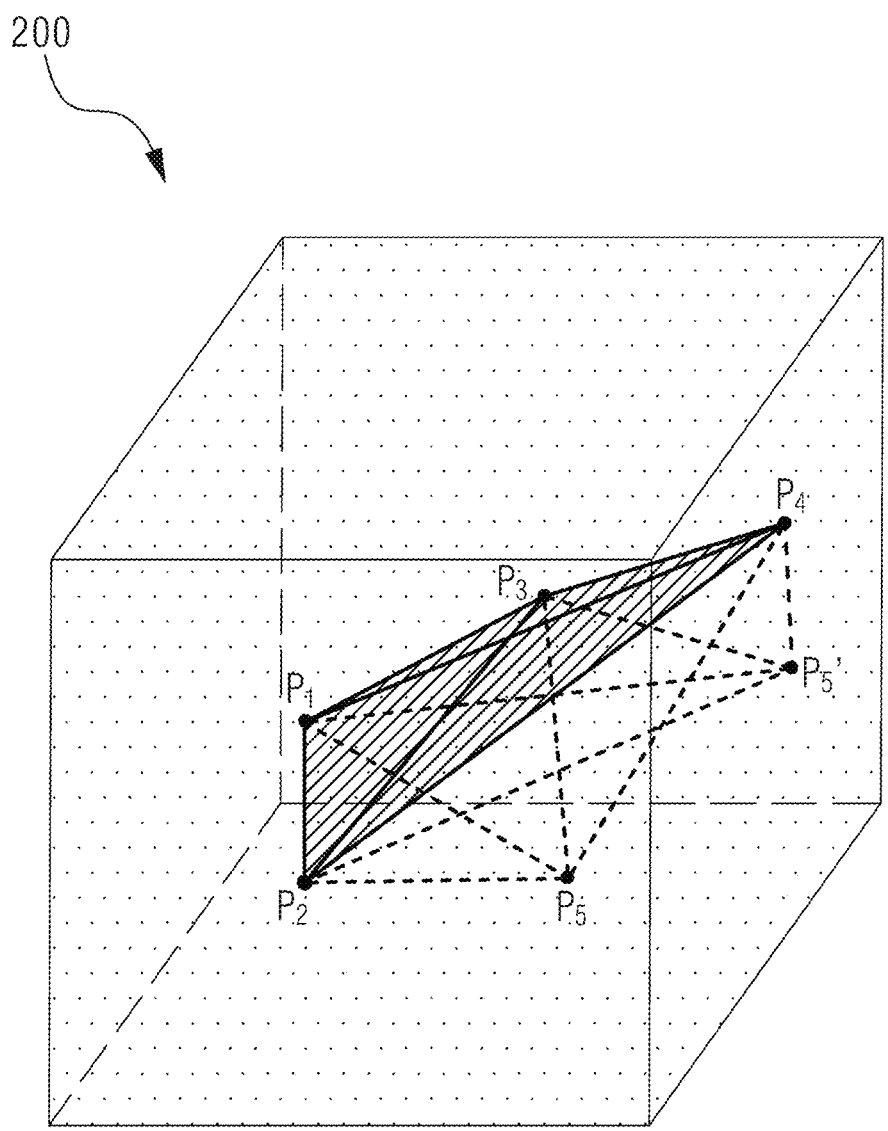
FIG. 2 is a schematic diagram of a point cloud model in a point cloud model reconstruction method according to a specific embodiment of the present invention.

Optionally, in the present invention, four non-coplanar reconstruction points may be randomly selected in the point cloud model according to information input by a user in the user interaction apparatus 100. For example, based on a point cloud model 200 shown in FIG. 2, a user selects four non-coplanar reconstruction points through the point initialization apparatus 118: a first reconstruction point p1, a second reconstruction point p2, a third reconstruction point p3, and a fourth reconstruction point p4. As shown in FIG. 2, the first reconstruction point p1, the second reconstruction point p2, the third reconstruction point p3, and the fourth reconstruction point p4 are non-coplanar.

Certainly, in the present invention, four non-coplanar initial reconstruction points may also be randomly specified instead of relying on specifying by a user.

Step S2 of keeping iteratively selecting, by a point iteration apparatus 162, other reconstruction points successively until a reconstruction condition is met, and reconstructing the point cloud model based on all reconstruction points is then performed. A reduction degree of a reconstructed point cloud model is:

$$\text{Reward} = -k \cdot (\text{PointNum} - 4) + g \cdot \text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree. The reconstruction method further includes the following step: adjusting a ratio of g to k based on user requirements to adjust the reconstruction condition. Specifically, as shown in FIG. 2, a negative calculation apparatus 122 in the reduction degree calculation apparatus 120 is configured to increase a weight of a negative factor (that is, k) by increasing a number of iterative reconstruction points, so as to reduce the reduction degree. A volume ratio calculation apparatus 124 is configured to calculate the volume ratio by reconstructing spatial information in the point processing apparatus 130, and increase authority of a positive factor (that is, g) to increase the reduction degree. The negative calculation apparatus 122 and the volume ratio calculation apparatus 124 in the calculation apparatus 120 may weigh weights of g and k, or may configure g and k according to the reconstruction condition. The parameter input apparatus 116 may control the weights of g and k based on a user selection.

Specifically, as shown in FIG. 1, after four non-coplanar reconstruction points are selected, the point iteration apparatus 162 is immediately triggered to continue to select other points in the point cloud model. All reconstruction points selected thereafter are sent to the point processing apparatus 130 to calculate spatial information of all of the reconstruction points by using a spatial information calculation apparatus 132. A calibration apparatus 134 is configured to check the spatial information to determine whether the reconstruction point conforms to a rule 1 and a rule 2. If the reconstruction point meets the rule 1 and the rule 2, a volume ratio of the reconstruction point is changed based on the spatial information, and the volume ratio is sent to the reduction degree calculation apparatus 120 to calculate the reduction degree of the reconstruction point. The reconstruction point is recorded in a path growth apparatus 142 in the path switching apparatus 140, and a path cutting apparatus 144 is configured to control growth and cutting of a path branch of the iterative reconstruction point. The recorded reconstruction point is sent to and stored in a point and path storage apparatus 163, and a branch starting from the reconstruction point further grows. If not, the branch starting from the reconstruction point is cut by the path cutting apparatus 144 in the path switching apparatus 140. It indicates that the branch starting from the reconstruction point no longer grows. The negative calculation apparatus 122 in the reduction degree calculation apparatus 120 is configured to increase the weight of the negative factor by increasing the number of iterative reconstruction points, so as to reduce the reduction degree. The volume ratio calculation apparatus 124 is configured to calculate the volume ratio by reconstructing spatial information in the point processing apparatus 130, and increase the authority of the positive factor to increase the reduction degree. In this way, a reduction degree of each iterative reconstruction point is calculated. Each calculated reduction degree is compared with a previous reduction degree in the comparison and calculation apparatus 164. If a current reduction degree is greater, the reduction degree is sent to a temporary storage apparatus 165 to replace the previous reduction degree. If the current reduction degree is less, a branch from the iterative reconstruction point is cut by the path cutting apparatus 144. A threshold of a mode that is initially set triggers the final output apparatus 166. The volume ratio calculated by the volume ratio calculation apparatus 124 is sent to a volume ratio comparison apparatus 152 in the mode switching apparatus 150 to compare the volume ratio with a volume ratio threshold. A comparison result is used as a trigger condition for the final output apparatus 166. A number of stored reconstruction points is sent to a depth comparison apparatus 154 to compare the number of the stored reconstruction points with a depth threshold. Alternatively, a reconstruction point comparison apparatus 156 is configured to compare the number of the stored reconstruction points with a threshold number of reconstructed points. The above are two trigger conditions for triggering the final output apparatus 166. Once the final output apparatus 166 is triggered, the reconstruction point and the path stored in the point and path storage apparatus 163 are converted into an output together with a final reduction degree.

Figure 4:
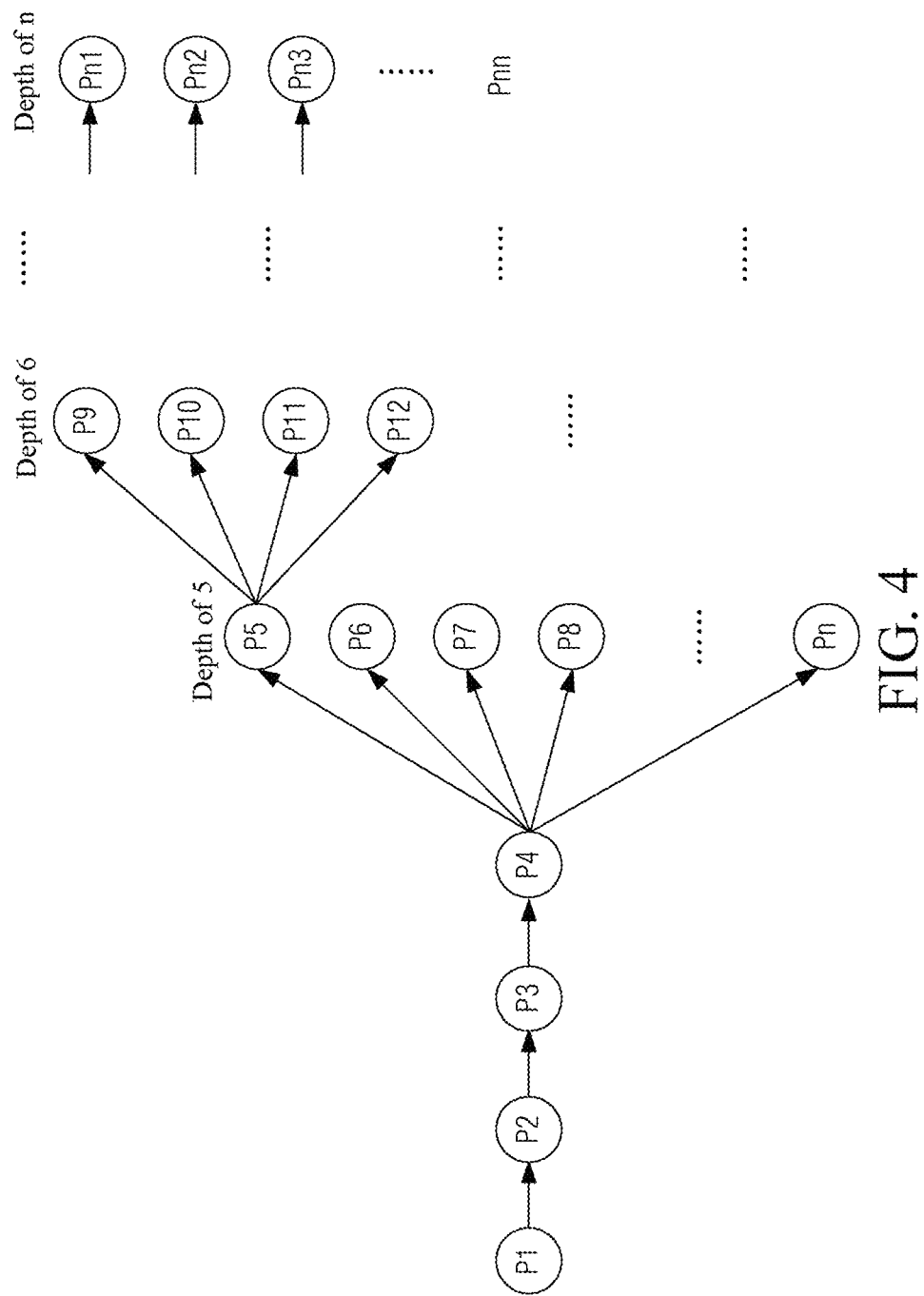
FIG. 4 is a schematic diagram of reconstruction point growth in a point cloud model reconstruction method according to a specific embodiment of the present invention.

Specifically, iteratively selecting other reconstruction points successively is a reconstruction point growth process. As shown in FIG. 4, the four reconstruction points: the first reconstruction point p1, the second reconstruction point p2, the third reconstruction point p3, and the fourth reconstruction point p4 are initially selected. Next, starting from the fourth reconstruction point P4, other reconstruction points are selected to form a reconstruction point growth path, and a path depth indicates a number of layers of the reconstruction points. Specifically, as shown in FIG. 4, in a growth path composed of the first reconstruction point p1, the second reconstruction point p2, the third reconstruction point p3, the fourth reconstruction point p4, a fifth reconstruction point p5, a ninth reconstruction point p9, . . . , and an $n^{th}$ reconstruction point, a sixth reconstruction point P6, a seventh reconstruction point P7, an eighth reconstruction point P8, and the $n^{th}$ reconstruction point Pn each have a depth of 5, the ninth reconstruction point p9, a tenth reconstruction point P10, an eleventh reconstruction point P11, and a twelfth reconstruction point P12 each have a depth of 6, . . . , and an $n1^{th}$ reconstruction point pn1, an $n2^{th}$ reconstruction point pn2, an $n3^{th}$ reconstruction point pn3, and an $nn^{th}$ reconstruction point pnn each have a depth of n. A next depth of each reconstruction point or a next-layer reconstruction point is a child node of the reconstruction point, for example, the fifth reconstruction point P5, the sixth reconstruction point P6, the seventh reconstruction point P7, the eighth reconstruction point P8, and the $n^{th}$ reconstruction point Pn are the child nodes of the fourth reconstruction point P4.

Further, the reconstruction method provided in the present invention needs to be performed based on specific rules. Basic rules are as follows: in a reconstruction method performed under each reconstruction condition, each reconstruction point is allowed to be selected only once; and a larger path depth of a selected reconstruction point indicates fewer reconstruction points as child nodes in each reconstruction point layer in the path. Regardless of whether the reconstruction method provided in the present invention is based on a first mode, a second mode, and a third mode, the above rules should be followed.

In addition, the present invention needs to be performed based on the following rules. Rule 1: if a first reconstruction point is collinear with two reconstruction points prior to the first reconstruction point, the first reconstruction point and a path branch thereafter are invalid. Rule 2: if a second reconstruction point is coplanar with three reconstruction points prior to the second reconstruction point, the second reconstruction point and a path branch thereafter are invalid. Rule 3: if a reduction degree based on all reconstruction point combinations is lower than a previous reduction degree when a third reconstruction point is selected, the third reconstruction point and a path branch thereafter are invalid.

According to different reconstruction conditions, the reconstruction method provided in the present invention may be performed in different modes. The reconstruction method provided in the present invention is described below according to three different implementation modes.

A first mode is first described. In the first mode, a total number of reconstruction points is defined and a reconstruction point combination with the highest reduction degree is selected as output. When the first implementation is selected, the first implementation mode is set in a mode setting apparatus 114, and a relevant threshold is set. The parameter input apparatus 116 inputs calculation input parameters of the reduction degree. Parameters related to the first implementation are stored in the parameter storage apparatus 161, and the above parameter is read when necessary.

When the reconstruction condition is that a combination of a defined total number of reconstruction point has the highest reduction degree, the reconstruction method further includes: defining a total number of reconstruction points; and keeping selecting other reconstruction points successively, calculating reduction degrees of different combinations of the total number of reconstruction points, respectively, and selecting the reconstruction point combination with the highest reduction degree. For example, if the total number of reconstruction points is defined as 8, after the first reconstruction point p1, the second reconstruction point p2, the third reconstruction point p3, and the fourth reconstruction point p4 are selected shown in FIG. 2, the fifth reconstruction point, the sixth reconstruction point, the seventh reconstruction point, and the eighth reconstruction point are selected. Each new reconstruction point is selected, a current reduction degree is recalculated.

Specifically, after the fourth reconstruction point p4 is selected, a fourth reduction degree of the point cloud model is:

$$Reward_4 = -k \cdot (8-4) + g \cdot VolRate = -4k + g \cdot VolRate_4,$$
where $VolRate_4$ is a ratio of a solid shape formed by the first reconstruction point p1, the second reconstruction point p2, the third reconstruction point p3, and the fourth reconstruction point p4 to an original volume of the point cloud model 200. The solid shape formed by the first reconstruction point p1, the second reconstruction point p2, the third reconstruction point p3, and the fourth reconstruction point p4 is an area of a shaded part shown in FIG. 2, and the original volume of the point cloud model 200 is a volume of a cube. It should be noted that when the model importing apparatus 112 imports the 3D model to obtain the point cloud model to be processed, the original volume of the point cloud model 200 can be obtained.

As shown in FIG. 2, after the fifth reconstruction point p5 is selected, a fourth reduction degree of the point cloud model is:

$$Reward_5 = -4k + g \cdot VolRate_5, \text{ where}$$

$VolRate_5$ is a ratio of a solid shape formed by the first reconstruction point p1, the second reconstruction point p2, the third reconstruction point p3, the fourth reconstruction point p4, and the fifth reconstruction point p5 to the original volume of the point cloud model 200. Optionally, if another fifth reconstruction point p5 is selected, $VolRate_5'$ is a ratio of a solid shape formed by the first reconstruction point p1, the second reconstruction point p2, the third reconstruction point p3, the fourth reconstruction point p4, and the fifth reconstruction point p5 to the original volume of the point cloud model 200. Therefore, if different fifth reconstruction points are randomly selected, volumes of solid shapes formed by the five reconstruction points are different. By analogy, if different sixth reconstruction points are randomly selected, volumes of solid shapes formed by the six reconstruction points are also different, and so on. Therefore, different combinations of eight reconstruction points indicate different reduction degrees.

Therefore, in this embodiment, after the first reconstruction point p1, the second reconstruction point p2, the third reconstruction point p3, and the fourth reconstruction point p4 are determined, combinations of all points in the point cloud model 200 except the first reconstruction point p1, the second reconstruction point p2, the third reconstruction point p3, and the fourth reconstruction point p4 may be randomly selected as the fifth reconstruction point, the sixth reconstruction point, the seventh reconstruction point, and the eighth reconstruction point. Therefore, after each reconstruction point is selected through arrangement and combination, a current reduction degree is calculated, until eight point combinations of all other points in the point cloud model 200 except the first reconstruction point p1, the second reconstruction point p2, the third reconstruction point p3 and the fourth reconstruction point p4 are calculated, so as to select the highest reduction degree Reward$_g$.

The second mode is described. In the second mode, a threshold is defined for the ratio of the volume of the solid shape formed by all of the current reconstruction points and the original volume of the point cloud model. Once the threshold is reached, a current reconstruction point combination is output. When the second implementation is selected, the second implementation mode is set in a mode setting apparatus 114, and a volume ratio threshold is set. The parameter input apparatus 116 inputs calculation input parameters of the reduction degree. Parameters related to the third implementation are stored in the parameter storage apparatus 161, and the above parameter is read when necessary.

When the reconstruction condition is that the ratio of the volume of the solid shape formed by all of the current reconstruction points and the original volume of the point cloud model reaches a first threshold, the reconstruction method further includes: defining the first threshold; and keeping selecting other reconstruction points successively, and calculating ratios of volumes of solid shapes formed by all of the current reconstruction points to the original volume of the point cloud model, respectively, until the first threshold is reached. It is assumed that the first threshold is 95%. Other reconstruction points keep growing from the fourth reconstruction point p4, and a volume ratio is always calculated. Once the volume ratio reaches 95%, a current reconstruction point combination and a reduction degree thereof are output.

Then a third mode is described, in which a selection range of other points after the fourth reconstruction point is defined, and a reconstruction point combination with the highest reduction degree in the range is selected. When the third implementation is selected, the third implementation mode is set in a mode setting apparatus 114, and a selection range of other reconstruction points is set. The parameter input apparatus 116 inputs calculation input parameters of the reduction degree. Parameters related to the third implementation are stored in the parameter storage apparatus 161, and the above parameter is read when necessary.

Figure 3:
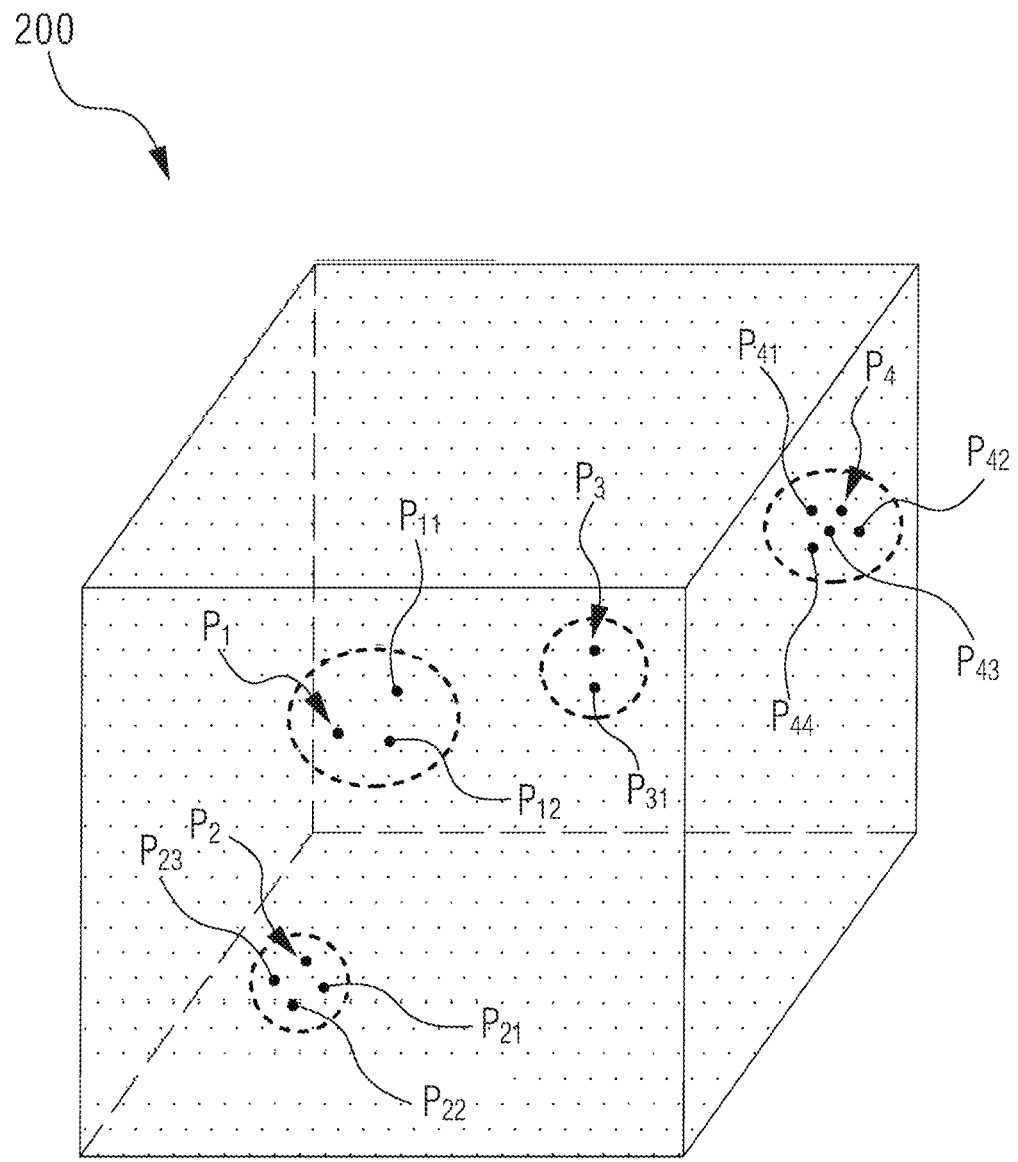
FIG. 3 is a schematic diagram of a point cloud model in a point cloud model reconstruction method according to another specific embodiment of the present invention.

When the reconstruction condition is that a reconstruction point combination in which a selection range of other reconstruction points is defined based on the four reconstruction points has the highest reduction degree, the reconstruction method further includes: defining the selection range of the other reconstruction points in the point cloud model by using the four reconstruction points; and keeping selecting other reconstruction points in the selection range successively, calculating reduction degrees of different reconstruction point combinations, respectively, and selecting the reconstruction point combination with the highest reduction degree. As shown in FIG. 3, in this embodiment, four selection ranges of other reconstruction points are defined. The first defined selection range surrounds the first reconstruction point p1, and it indicates that reconstruction points p11 and p12 may be selected. The second defined selection range surrounds the second reconstruction point p2, and it indicates that reconstruction points p21, p22, and p23 may be selected. The third defined selection range surrounds the third reconstruction point p3, and it indicates that a reconstruction point p31 may be selected. The fourth defined selection range surrounds the fourth reconstruction point p4, and it indicates that reconstruction points p41, p42, p43, and p44 may be selected. A reconstruction point combination with the highest reduction degree is iteratively selected from the reconstruction points p11, p12, p21, p22, p23, p41, p42, p43, and p44.

It should be noted that, optionally, the reconstruction point selection range may be based on a user selection.

Figure 5:
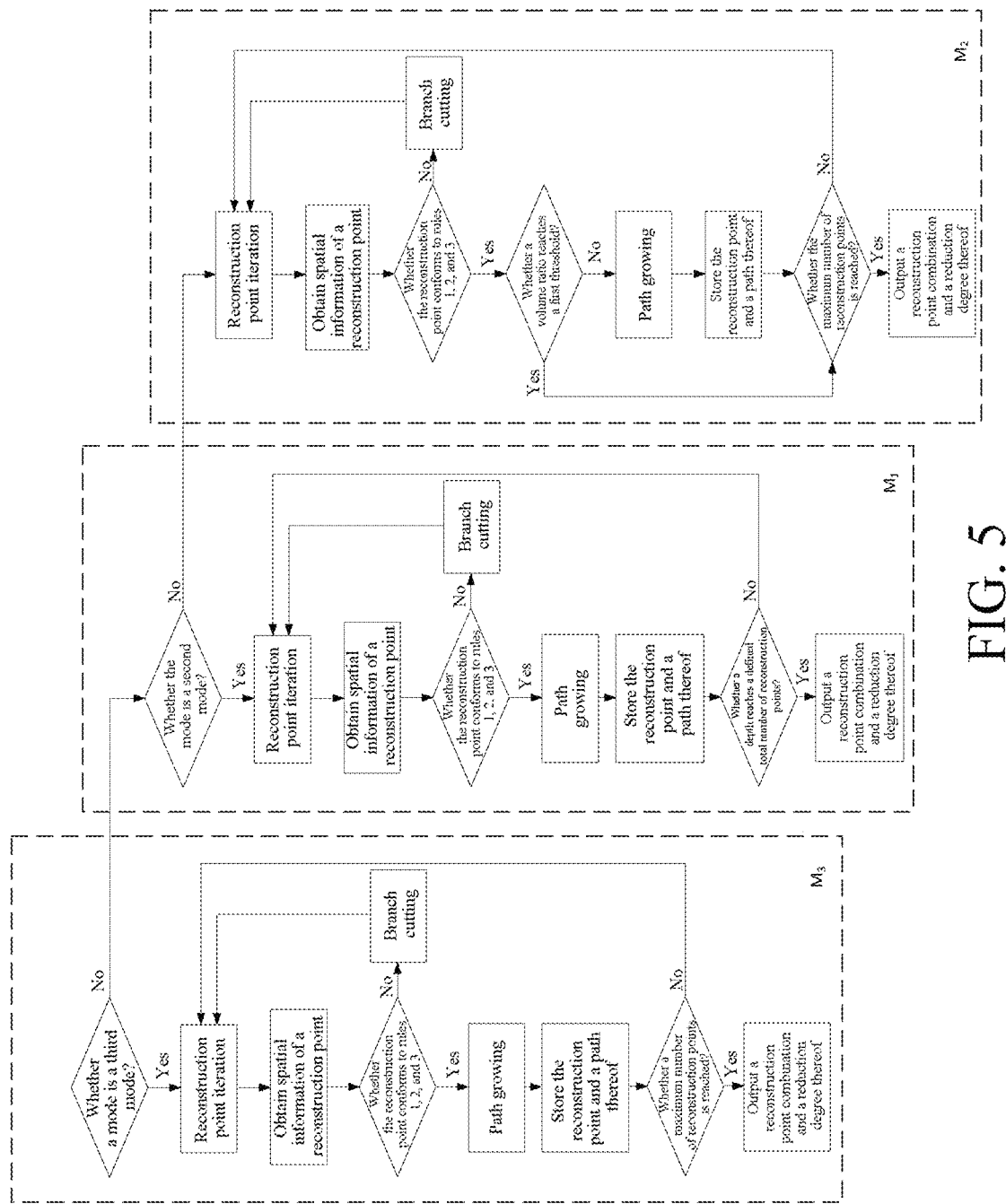
FIG. 5 is a flowchart of steps of three implementation modes of a point cloud model reconstruction method according to a specific embodiment of the present invention.

FIG. 5 is a flowchart of steps of three implementation modes of a point cloud model reconstruction method according to a specific embodiment of the present invention. According to a specific embodiment of the present invention, after the model importing apparatus 112 imports the 3D model to obtain the point cloud model, a user may input the parameters g and k through the parameter input apparatus 116, or select one of the first mode, the second mode, and the third mode through the mode setting apparatus 114, or may select four non-coplanar reconstruction points through the point initialization apparatus 118. As shown in FIG. 5, the user may also first determine whether a mode is the third mode. If yes, a step process in M3 is performed. If not, the user continues to determine whether the mode is the second mode. If yes, a step process in M1 is performed. Otherwise, a step process in M2 is performed.

When the mode is the third mode M3, the point iteration apparatus 162 iteratively selects other reconstruction points successively from the fifth reconstruction point, and obtains spatial information of the selected reconstruction points by using the spatial information calculation apparatus 132. Then it is determined whether the reconstruction point conforms to rules 1, 2 and 3. If yes, a reconstruction point path grows from the fourth reconstruction point and a reconstruction point and a path thereof are stored in the path growth apparatus 142. Otherwise, growth and cutting of a path branch of the iterative reconstruction point are controlled through the path cutting apparatus 144. Finally, the reconstruction point comparison apparatus 156 determines whether reconstruction point combinations reach a maximum reconstruction point number. If yes, the reconstruction point combination and a reduction degree are output through the final output apparatus 166. If not, the point iteration apparatus 162 is re-triggered to iteratively select other reconstruction points.

When the mode is the first mode M1, the point iteration apparatus 162 iteratively selects other reconstruction points successively from the fifth reconstruction point, and obtains spatial information of the selected reconstruction points by using the spatial information calculation apparatus 132. Then it is determined whether the reconstruction point conforms to rules 1, 2 and 3. If yes, a reconstruction point path grows from the fourth reconstruction point and a reconstruction point and a path thereof are stored in the path growth apparatus 142. Otherwise, growth and cutting of a path branch of the iterative reconstruction point are controlled through the path cutting apparatus 144. A number of stored reconstruction points is sent to the depth comparison apparatus 154. The depth comparison apparatus 154 is configured to compare the number of stored reconstruction points with a depth threshold to determine whether the number reaches a defined total number of reconstruction points. If yes, a reconstruction point combination and a reduction degree thereof are output through the final output apparatus 166. If not, the point iteration apparatus 162 is re-triggered to iteratively select other reconstruction points.

When the mode is the second mode M2, the point iteration apparatus 162 iteratively selects other reconstruction points successively from the fifth reconstruction point, and obtains spatial information of the selected reconstruction points by using the spatial information calculation apparatus 132. Then it is determined whether the reconstruction point conforms to rules 1, 2 and 3. If not, growth and cutting of a path branch of the iterative reconstruction point are controlled through the path cutting apparatus 144. A current volume ratio of each reconstruction point is calculated by the volume ratio calculation apparatus 124, and is sent to the volume ratio comparison apparatus 152 in the mode switching apparatus 150 to determine whether the volume ratio reaches the first threshold. If not, the reconstruction point path continues to grow and a reconstruction point and a path thereof are stored in the path growth apparatus 142, and then it is determined through the reconstruction point comparison apparatus 156 whether the reconstruction point combination reaches a maximum reconstruction point number. If yes, the reconstruction point combination and a reduction degree thereof are output through the final output apparatus 166. If not, the point iteration apparatus 162 is re-triggered to iteratively select other reconstruction points.

A second embodiment of the present invention provides a point cloud model reconstruction apparatus, including: a selection apparatus configured to randomly select four non-coplanar reconstruction points in the point cloud model; a reconstruction apparatus configured to keep iteratively selecting other reconstruction points successively until a reconstruction condition is met, reconstruct the point cloud model based on all reconstruction points, and adjust a ratio of g to k based on user requirements to adjust the reconstruction condition, where a reduction degree of a reconstructed point cloud model is:

$$\text{Reward}=-k\cdot(\text{PointNum}-4)+g\cdot\text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree.

Further, when the reconstruction condition is that a combination of a defined total number of reconstruction points has the highest reduction degree, the reconstruction apparatus is further configured to: define a total number of reconstruction points; and keep selecting other reconstruction points successively, calculate reduction degrees of different combinations of the total number of reconstruction points, respectively, and select the reconstruction point combination with the highest reduction degree.

Further, when the reconstruction condition is that the ratio of the volume of the solid shape formed by all of the current reconstruction points and the original volume of the point cloud model reaches a first threshold, the reconstruction apparatus is further configured to: define the first threshold; and keep selecting other reconstruction points successively, and calculate ratios of volumes of solid shapes formed by all of the current reconstruction points to the original volume of the point cloud model, respectively, until the first threshold is reached.

Further, when the reconstruction condition is that a reconstruction point combination in which a selection range of other reconstruction points is defined based on the four reconstruction points has the highest reduction degree, the reconstruction apparatus is further configured to: define the selection range of the other reconstruction points in the point cloud model by using the four reconstruction points; and keep selecting other reconstruction points in the selection range successively, calculate reduction degrees of different reconstruction point combinations, respectively, and select the reconstruction point combination with the highest reduction degree.

Further, the reconstruction apparatus performs operations based on the following rules: in a reconstruction method performed under each reconstruction condition, each reconstruction point is allowed to be selected only once; a larger path depth of a selected reconstruction point indicates fewer reconstruction points as child nodes in each reconstruction point layer in the path; if a first reconstruction point is collinear with two reconstruction points prior to the first reconstruction point, the first reconstruction point and a path branch thereafter are invalid; if a second reconstruction point is coplanar with three reconstruction points prior to the second reconstruction point, the second reconstruction point and a path branch thereafter are invalid; and if a reduction degree based on all reconstruction point combinations is lower than a previous reduction degree when a third reconstruction point is selected, the third reconstruction point and a path branch thereafter are invalid.

A third embodiment of the present invention provides a point cloud model reconstruction system, including: a processor; and a memory coupled to the processor, where the memory stores instructions that, when executed by the processor, cause an electronic device to perform actions including: randomly selecting four non-coplanar reconstruction points in a point cloud model; keeping iteratively selecting other reconstruction points successively until a reconstruction condition is met, and reconstructing the point cloud model based on all reconstruction points, where a reduction degree of a reconstructed point cloud model is:

$$\text{Reward}=-k\cdot(\text{PointNum}-4)+g\cdot\text{VolRate, where}$$

PointNum represents a number of current selected reconstruction points, VolRate represents a ratio of a volume of a solid shape formed by all of the current reconstruction points and an original volume of the point cloud model, k represents a proportion of the number of the selected points in the reduction degree, and g represents a proportion of the volume ratio in the reduction degree; and adjusting a ratio of g to k based on user requirements to adjust the reconstruction condition A fourth embodiment of the present invention provides a computer program product tangibly stored on a computer readable medium and including computer executable instruction that, when executed, cause at least one processor to perform the method according to the first embodiment of the present invention.

A fifth embodiment of the present invention provides a computer readable medium storing computer executable instructions that, when executed, cause at least one processor to perform the method according to the first embodiment of the present invention.

The point cloud model reconstruction mechanism provided in the present invention can improve resolution of a reconstructed point cloud model, control quality of points in the reconstructed point cloud model, and extract a feature point from a 3D point cloud model. In the present invention, point cloud model reconstruction can be further performed based on a user selection and inputted information. In addition, in the present invention, a display capability and utilization of computing resources can be improved, and a display capability of the point cloud model on an edge device can be optimized. In addition, in the present invention, a point cloud model can be presented based on a small number of points, and a data set can be generated for machine learning, for example, in 3D object recognition and localization.

Although the content of the present invention has been described in detail through the above preferred embodiments, it should be understood that the above description should not be considered as a limitation on the present invention. For those skilled in the art, various modifications and replacements to the present invention will be apparent after reading the above content. Therefore, the protection scope of the present invention should be subject to the appended claims. In addition, any reference numerals in the claims shall not be construed as limiting the claims; the word "include/comprise" does not exclude apparatuses or steps not listed in other claims or the specification; the words such as "first" and "second" are only used to indicate names, and do not indicate any particular order.

What is claimed is:

1. A point cloud model reconstruction method, comprising:
   randomly selecting four non-coplanar reconstruction points in a point cloud model;
   iteratively selecting other reconstruction points successively, until a reconstruction condition is met, and reconstructing the point cloud model based on all reconstruction points selected, wherein a reduction degree of a reconstructed point cloud model is:

$$Reward=-k\cdot(PointNum-4)+g\cdot VolRate, wherein$$

PointNum represents a number of current reconstruction points selected, VolRate represents a ratio of a volume of a solid shape formed by all of the current reconstruction points and an original volume of the point cloud model, k represents a proportion of the number of the current reconstruction points selected in the reduction degree, and g represents a proportion of the volume ratio in the reduction degree; and
   adjusting a ratio of g to k based on user requirements to adjust the reconstruction condition.

2. The point cloud model reconstruction method of claim 1, wherein when the reconstruction condition is that a combination of a defined total number of reconstruction points has a relatively highest reduction degree, the point cloud model reconstruction method further comprising:
   defining a total number of reconstruction points; and
   selecting other reconstruction points successively, calculating reduction degrees of different combinations of the total number of reconstruction points, respectively, and selecting the reconstruction point combination with the relatively highest reduction degree.

3. The point cloud model reconstruction method of claim 1, wherein when the reconstruction condition is that the ratio of the volume of the solid shape formed by all of the current reconstruction points and the original volume of the point cloud model reaches a first threshold, the point cloud model reconstruction method further comprises:
   defining the first threshold; and
   selecting other reconstruction points successively, and calculating ratios of volumes of solid shapes formed by all of the current reconstruction points to the original volume of the point cloud model, respectively, until the first threshold is reached.

4. The point cloud model reconstruction method of claim 1, wherein when the reconstruction condition is that a reconstruction point combination in which a selection range of other reconstruction points is defined based on the four reconstruction points have a relatively highest reduction degree, the point cloud model reconstruction method further comprises:
   defining the selection range of the other reconstruction points in the point cloud model by using the four reconstruction points; and
   selecting other reconstruction points in the selection range successively, calculating reduction degrees of different reconstruction point combinations, respectively, and selecting the reconstruction point combination with the relatively highest reduction degree.

5. The point cloud model reconstruction method of claim 1, wherein the reconstruction method is performed based on rules comprising:
   in a reconstruction method performed under each reconstruction condition, each reconstruction point is allowed to be selected only once;
   a relatively larger path depth of a selected reconstruction point indicates relatively fewer reconstruction points as child nodes in each reconstruction point layer in the path;
   if a first reconstruction point is collinear with two reconstruction points prior to the first reconstruction point, the first reconstruction point and a path branch thereafter are invalid;
   if a second reconstruction point is coplanar with three reconstruction points prior to the second reconstruction point, the second reconstruction point and a path branch thereafter are invalid; and
   if a reduction degree based on all reconstruction point combinations is relatively lower than a previous reduction degree when a third reconstruction point is selected, the third reconstruction point and a path branch thereafter are invalid.

6. A non-transitory computer readable medium, storing a computer executable instruction, the computer executable instruction enabling at least one processor to execute the method of claim 1, when being executed.

7. A point cloud model reconstruction system, comprising:
   a processor; and
   a memory coupled to the processor, the memory storing instructions, the instructions, when executed by the processor, cause an electronic device to perform actions comprising:
   randomly selecting four non-coplanar reconstruction points in a point cloud model;
   iteratively selecting other reconstruction points successively, until a reconstruction condition is met, and reconstructing the point cloud model based on all reconstruction points selected, wherein a reduction degree of a reconstructed point cloud model is:

$$Reward=-k\cdot(PointNum-4)+g\cdot VolRate, wherein$$

PointNum represents a number of current reconstruction points selected, VolRate represents a ratio of a volume of a solid shape formed by all of the current reconstruction points and an original volume of the point cloud model, k represents a proportion of the number of the current reconstruction points selected in the reduction degree, and g represents a proportion of the volume ratio in the reduction degree; and adjusting a ratio of g to k based on user requirements to adjust the reconstruction condition.

8. The point cloud model reconstruction system of claim 7, wherein when the reconstruction condition is that a combination of a defined total number of reconstruction points has a relatively the highest reduction degree, the actions further comprise:
- defining a total number of reconstruction points; and
- selecting other reconstruction points successively, calculating reduction degrees of different combinations of the total number of reconstruction points, respectively, and selecting the reconstruction point combination with the relatively highest reduction degree.

9. The point cloud model reconstruction system of claim 7, wherein when the reconstruction condition is that the ratio of the volume of the solid shape formed by all of the current reconstruction points and the original volume of the point cloud model reaches a first threshold, the actions further comprise:
- defining the first threshold; and
- selecting other reconstruction points successively, and calculating ratios of volumes of solid shapes formed by all of the current reconstruction points to the original volume of the point cloud model, respectively, until the first threshold is reached.

10. The point cloud model reconstruction system of claim wherein when the reconstruction condition is that a reconstruction point combination in which a selection range of other reconstruction points is defined based on the four reconstruction points has a relatively highest reduction degree, the actions further comprise:
- defining the selection range of the other reconstruction points in the point cloud model by using the four reconstruction points; and
- selecting other reconstruction points in the selection range successively, calculating reduction degrees of different reconstruction point combinations, respectively, and selecting the reconstruction point combination with the relatively highest reduction degree.

11. The point cloud model reconstruction system of claim 7, wherein the actions are performed based on rules comprising:
- in a reconstruction method performed under each reconstruction condition, each reconstruction point is allowed to be selected only once;
- a relatively larger path depth of a selected reconstruction point indicates relatively fewer reconstruction points as child nodes in each reconstruction point layer in the path;
- if a first reconstruction point is collinear with two reconstruction points prior to the first reconstruction point, the first reconstruction point and a path branch thereafter are invalid;
- if a second reconstruction point is coplanar with three reconstruction points prior to the second reconstruction point, the second reconstruction point and a path branch thereafter are invalid; and
- if a reduction degree based on all reconstruction point combinations is relatively lower than a previous reduction degree when a third reconstruction point is selected, the third reconstruction point and a path branch thereafter are invalid.

\* \* \* \* \*